United States Patent [19]
McWhirter, deceased

[11] 3,857,138
[45] Dec. 31, 1974

[54] ELECTRONIC RELAXER AND STABILIZER
[75] Inventor: Garland McWhirter, deceased, late of Kansas City, Mo.
[73] Assignee: Jerry McWhirter, by said Nell J. McWhirter
[22] Filed: Jan. 22, 1973
[21] Appl. No.: 325,664

[52] U.S. Cl. .................................................. 17/11
[51] Int. Cl............................................. A22b 3/08
[58] Field of Search ................................. 7/1 E, 11

[56] References Cited
UNITED STATES PATENTS
2,210,376  8/1940  Onorato ........................... 17/1 E X
3,314,102  4/1967  Rains.................................... 17/1 E
3,702,017  11/1972  Lewis.................................... 17/11

Primary Examiner—G. E. McNeill
Attorney, Agent, or Firm—Fishburn, Gold & Litman

[57] ABSTRACT

An apparatus using an electric shock to relax and stabilize poultry as they move along a defined path in a poultry processing plant. The apparatus includes a frame structure with electrodes mounted thereon in spaced apart relation and has an electric power supply connected to the electrodes to apply an electric potential difference therebetween. Conveying means carry the poultry, that are to be processed, through the apparatus wherein the poultry engages the electrodes and forms a conductive path therebetween so that an electric current from the power supply passes through the poultry to shock and relax them. Non-conductor shields and insulator structure prevent current from passing through the conveyor and protects persons from contact with conductors.

11 Claims, 5 Drawing Figures

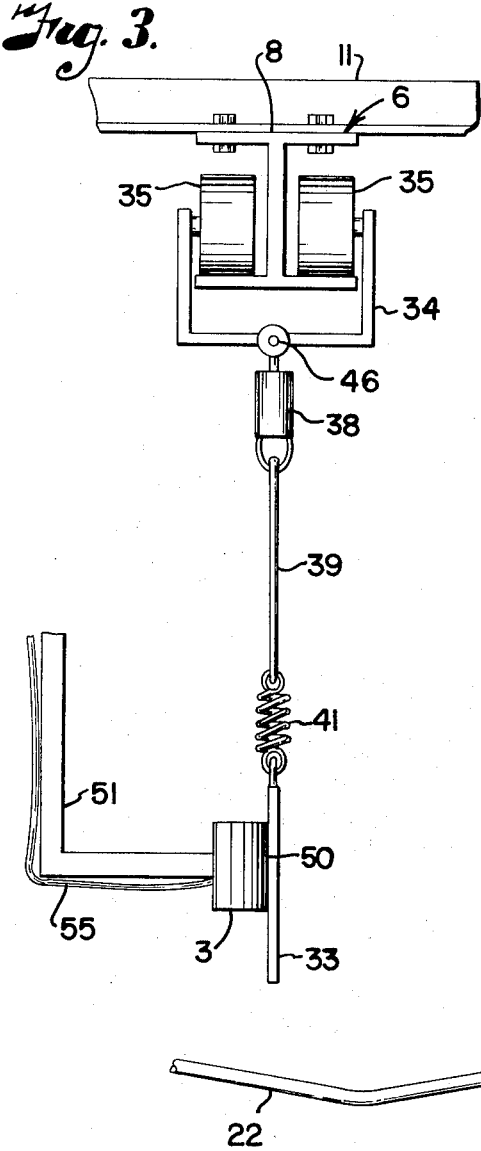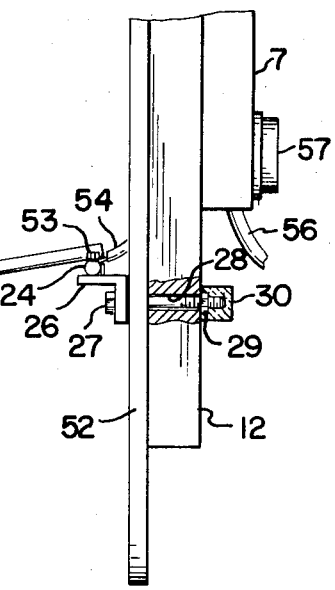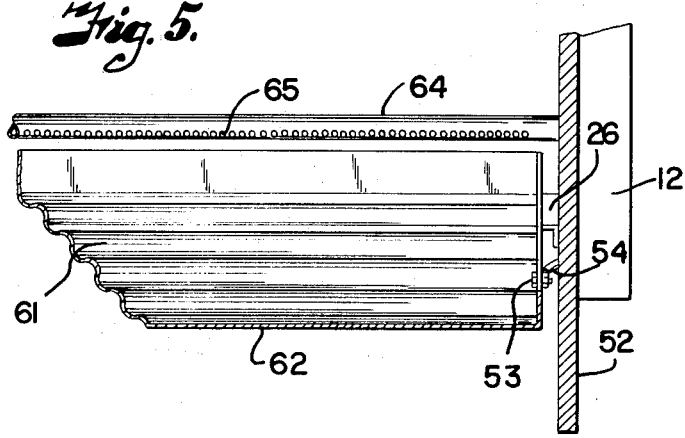

ELECTRONIC RELAXER AND STABILIZER

During the slaughter process of poultry, the poultry and processing equipment may be damaged by fighting, struggling and excessive movement of frightened poultry. Attempts have been made in the past to relax poultry during the slaughter process but such attempts have been plagued with difficulties. Such difficulties include machinery or devices that will not meet present sanitary standards, that do not adequately relax all the poultry, are not humane, etc.

The principal objects of the present invention are: to provide a relaxing and stabilizing apparatus that uses an electric current or shock to relax poultry that are to be slaughtered that eliminates the above difficulties; to provide such apparatus that may be added in line to existing slaughter equipment; to provide such apparatus with electrodes to contact the bird to supply electric current thereto wherein the electrodes are shaped to have minimum of build-up of waste matter that is produced during the slaughter process; to provide such apparatus with means to adjust the electric current so as to achieve maximum relaxation; to provide such apparatus that is adjustable so as to be adaptable for use with different sizes of poultry; to provide such apparatus with shields to prevent accidental shocking of operators; to provide such apparatus that is simple in construction, economical to manufacture and maintain, that is safe and sanitary to use and suitable for its intended use.

Other objects and advantages of the present invention will become apparent from the following description taken in connection with the accompanying drawings wherein are set forth by way of illustration and example certain embodiments of this invention.

FIG. 3 is an end enlarged view of the conveying means.

FIG. 4 is an enlarged sectional view of the connection of the lower electrode to the framework.

FIG. 5 is an enlarged partial end view of a modified form of a lower electrode.

Figure 1:
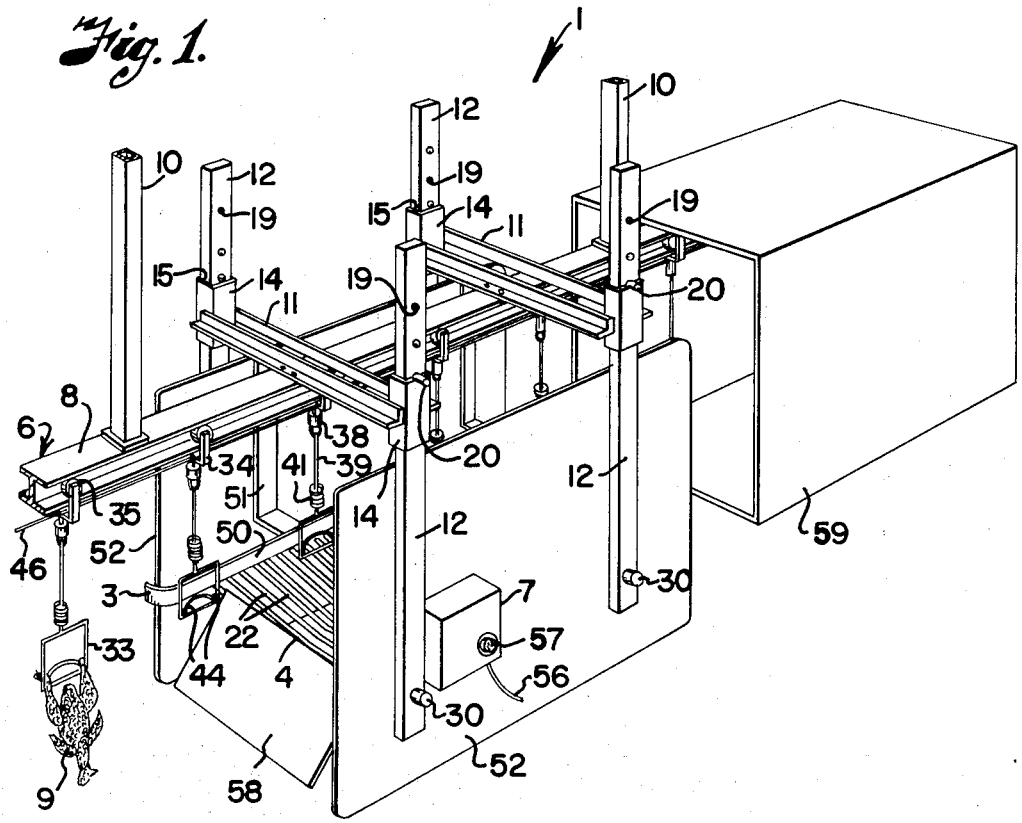
FIG. 1 is a perspective view of the electronic relaxer and stabilizer.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

The reference numeral 1 designates generally an electronic stunning apparatus used in the slaughter process of poultry that uses an electric current to shock the poultry for relaxing it. The apparatus 1 is comprised of upper and lower electrodes 3 and 4 respectively that are suitably supported in spaced apart relation adjacent to conveying means 6 and are operable to electrically contact portions of the poultry 9 as they move through the relaxer apparatus 1. The electrodes 3 and 4 are connected to an electric power supply 7 that is operable to apply an electric potential difference between the electrodes 3 and 4 to shock and stun poultry 9. The poultry 9 is suitably suspended head down from the conveying means 6 and when it comes into electrical contact with the electrodes 3 and 4, during travel through the relaxer 1, an electrically conductive path is formed between the electrodes 3 and 4 by the poultry 9 whereby an electric current passes through the poultry 9 to shock it.

The conveying means 6 is of generally standard construction and as illustrated includes a conveying track 8 such as an I-beam that is supported in spaced relation from the floor of the processing plant by any suitable means and defines a path of movement. As illustrated, the conveying track 8 has suspending members 10 secured thereto that are also secured to a wall or ceiling of the processing plant for suspending the conveying track 8. Beam members 11 are secured to the conveying track 8 in spaced apart relation therealong and extend laterally from both sides thereof. A support post 12 is adjustably mounted at each end of the beams 11 and depends downwardly therefrom. The lower electrode 4 is suitably supported at the lower ends of said support posts. The support posts 12 preferably are of a non-conductive and non-moisture absorbing material. The beams 11 are preferably structural members and in the illustrated structure include angle iron members secured to the conveying track and extending transversely therefrom. A support post mounting member 14 secured to each end thereof provides for said posts 12 to be adjustably supported for up and down movement to vary the space between the track and lower electrode. The members 14 each have an opening 15 extending therethrough that are suitably shaped for receiving a respective support post 12 that is movable within the respective opening 15 and is held in a selected position. As illustrated, the posts 12 are held in a selected position by each having a plurality of through apertures 19 adjacent the upper end thereof. A suitable stop member 20 is placed in the desired aperture 19 and upon engagement with the upper edge of the respective member 14, the posts 12 and the lower electrode 4 are held in the selected position.

Figure 2:
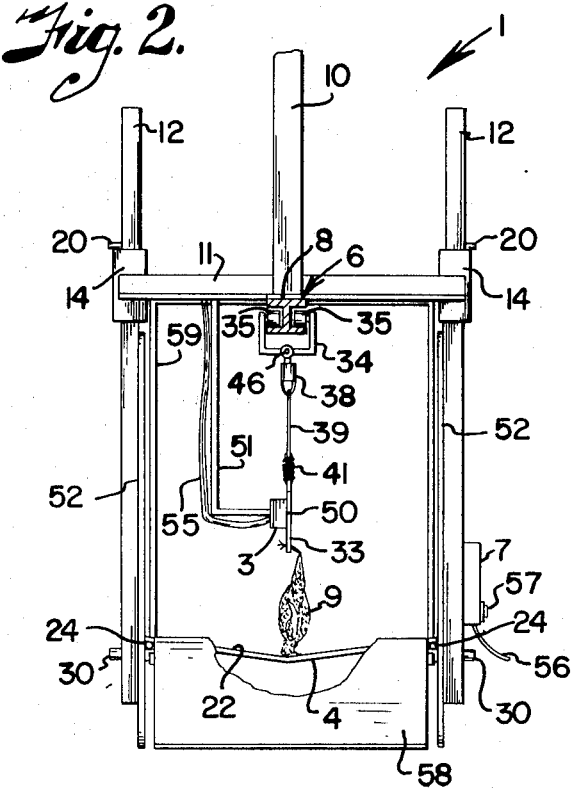
FIG. 2 is an end elevational view of the electronic relaxer and stabilizer.

The lower electrode 4 is shaped with portions of the upper surface sloping downwardly and having openings therethrough to facilitate drainage of waste material therefrom. As illustrated, the lower electrode 4 is a conductive grid comprised of a plurality of rod or round members 22 suitably secured together in spaced apart relation. The rod members 22 and elongate side members 24 are made of an electrically conductive and corrosion resistant material and are secured together in such a manner, such as by welding, to form an electric path therebetween, with the elongate side members 24 extending the length of the lower electrode 4 and being secured to the rod members 22 adjacent the ends thereof. The rod members 22 extend transversely of the conveying track 8 and as best seen in FIG. 2, the electrode 4 is V-shaped with the lower portion centrally under the track 8 and the member 22 diverging upwardly and laterally whereby the apex of the electrode 4 extends longitudinally along the relaxing device 1.

The electrode 4 is secured to the posts 12 to support same from the conveying track 8. As illustrated, mounting members 26 are secured to the posts 12 by securing devices 27 such as bolts that extend through each mounting member 26 and through an aperture 28 of each post 12 and has means such as a nut 29 in engagement therewith to secure the mounting members 26 to the respective support post 12. The exposed portions of the securing devices 27 are protected from accidental contact by suitable non-conductive members or insulators 30 secured thereto. In the illustrated structure, the insulators 30 are in threaded engagement with the shank of the securing device 27 and enclose the nuts 29 therein. The lower electrode 4 is supported by the mounting members 26 and is suitably secured thereto preferably in such a manner as to be easily removable and to be electrically insulated therefrom.

The conveying means 6 includes shackles 33 that are supported by the conveying track 8 and as illustrated are suspended therefrom. The shackles 33 are movable along the conveying track 8 and preferably are electrically insulated therefrom to electrically isolate them from the rest of the processing equipment. Insulating and suspension is accomplished in the form shown by having the shackles 33 each connected to a supporting bracket or trolley 34 that has wheel members 35 rotatably mounted thereon that engage the upper surface of opposite flange portions of the I-beam shaped conveying track 8. The shackles 33 are each suitably suspended from a respective support bracket 34 by an electrically non-conductive hanger 38. A link member 39 engages the hanger 38 and has a spring member 41 mounted on the lower end thereof with the shackle 33 suspended from the spring member 41. The shackles 33 are of generally standard construction that are of a type normally used in processing plants and are made of a corrosion resistant electrically conductive material such as stainless steel. In the illustrated structure, the shackles 33 each have two slots 44 for receiving the legs of the poultry 9 wherein the slots 44 are shaped and sized to prevent the toes of the bird from moving therethrough so as to suspend poultry 9 therefrom wherein the head of each bird is hanging downwardly. The conveyor includes a moving member such as a flexible cable or chain 46 connected to a driving structure (not shown) to move in the defined path. The support brackets or hangers 34 are suitably attached to the conveyor cable or chain and are moved thereby through the relaxer 1 along the conveying track 8.

The upper electrode 3 in the illustrated structure is a conductive guide rail that is suitably supported so the lower electrode 4 can be adjusted without moving the upper electrode 3 and is positioned adjacent to the path of the shackles 33. The upper electrode 3 in the illustrated structure extends the length of the relaxer 1 and has a face 50 parallel to the path of movement and is suspended by having support brackets 51 secured to the beams 11 depending therefrom having the electrode 3 secured thereto wherein it is electrically insulated from the support brackets 51. The support brackets 51 are shaped and positioned for the electrode 3 to have electrical contact with the shackles 33 throughout the length of the relaxer 1. Electrical contact between the electrode 3 and the shackles 33 is assured by the rail being positioned past the center of the shackle path if hanging freely thereby urging the shackles 33 off center slightly so that the weight of the shackle 33 and/or the poultry 9 maintains engagement and electrical contact between the electrode 3 and the shackles 33 forming an electrical path therebetween.

It is to be noted that the electrode 3 can have selected areas insulated from the shackles 33 such as by having a coating of insulating material in selected areas so as to control the length of time and/or the number of electrical contacts between the shackles 33 and the electrode 3 for a purpose later described.

Guard means are provided for the relaxing apparatus 1 to help prevent plant operating personnel from accidentally being shocked by contacting the electrodes 3 or 4. As illustrated, the guard means include opposed shield panel members 52 that are suitably secured to respective support posts 12. The panel members are adjacent sides of the lower electrode 4 and positioned between the electrode 4 and the respective support posts 12. The panel members 52 are of a non-moisture absorbing and electrically non-conductive material so as to prevent the formation of an electrical path and extend longitudinally along the relaxing device 1 beyond each end of the lower electrode 4. The panel members 52 also extend sufficiently below the electrode 4 to prevent accidental contact therewith from the underneath side as during cleaning of the processing plant.

The electrodes 3 and 4 are electrically connected to the power supply 7 so as to provide an electric potential difference or change therebetween to shock and stun the poultry 9. As illustrated, one lead 54 from the power supply 7 is connected to the electrode 4 by a suitable fastener 53 such as a screw urging the lead 54 into electrical contact with the electrode 4. The remaining lead 55 from the power supply 7 is suitably secured to the electrode 3 so as to be in electrical contact therewith. The power supply 7 is connected to the electrical power source existing in the processing plant by a conductor 56. It is preferable to have a unidirectional or direct current supplied to the electrodes 3 and 4 which is produced by rectifying alternating current from the power source. Controls 57 such as a rheostat are included in the power supply 7 to adjust the electric charge between the electrodes 3 and 4. A lead-in board 58 is suitably secured to and supported by the relaxer 1 sloping upwardly toward the lower electrode 4 and extending between the opposed panel members 52 whereby the heads of the poultry 9 will engage same when moving into the relaxer 1 thereby preventing their catching on the leading edge of the lower electrode 4. Preferably, the lead-in board 58 is made of a smooth non-conductive, non-moisture absorbing material.

In operating the relaxing apparatus, the spacing between the electrodes 3 and 4 is set at the desired distance by moving the support posts 12 in relation to the beams 11 and placing the stop members 20 in the proper apertures 19. The conveyor is operated and the desired electrical circuit applied to the electrodes. Poultry 9 are then suspended from the shackles 33 by placing their legs in the slots 44 with the heads down. The shackles 33 move along the conveying track 8 by movement of the cable 46 whereby the poultry 9 are moved through the relaxer 1. When entering the relaxer 1, the shackles 33 move into engagement with the electrode 3 which has an arcuate or curved end to help align the shackles 33 whereby the poultry 9 are facing in a common direction normal to the direction of movement. With the shackles 33 in electrical contact with the electrode 3 and with the heads of the poultry 9 in contact with the lower electrode 4, the poultry 9 completes the circuit between the electrodes 3 and 4 whereby current passes through the poultry 9 so that they are shocked and relaxed. The rods 22 are spaced close enough together so that the heads of the poultry 9 will be in electrical contact with a following rod 22 before breaking contact with the preceding rod 22 so as to assure continuous contact with the electrode 4. The length of time and/or the number of shocks supplied to the birds 9 is controlled by the electrical contact between the shackles 33 and the electrode 3 which can be varied as described above. The poultry 9 move through the relaxer 1 toward a bleed tunnel 59. The relaxation due to the shocking helps improve the bleeding and also improves venting of the poultry 9, that is, defecating. The relaxation of the poultry 9 substantially reduces their propensity to fight, struggle and make sudden movements that result in damage to the machinery and also decreases the possibility of broken bones. The bars 22 preferably are round and with the electrode 4 being V-shaped any waste material from the poultry 9 will tend to flow down same preventing a build-up thereon.

A modified form as illustrated in FIG. 5 illustrates an alternative lower electrode. The lower electrode 61 is secured to and extends between the posts 12 and is an upwardly opening channel formed of a conductive material such as stainless steel and has a lower surface 62 that is corrugated with the corrugations extending transversely of the relaxer 1. Preferably, the lower surface 62 is inclined upwardly from the incoming end adjacent the lead in board 58 toward the bleed tunnel 59. Water is supplied to the lower electrode 61 by any suitable means and as illustrated a pipe 64 is mounted thereon and is electrically insulated therefrom. The pipe 64 is adjacent the higher inclined end of the electrode 61 and water flowing through openings 65 flows onto the corrugated surface 62 flowing thereon to a suitable drain (not shown) adjacent the lower end of the electrode 61 which can be open to allow the water to flow off the corrugated surface 62. The electrode 61 is electrically connected to the power supply 7 similar to the electrode 4. Poultry 9 will engage the corrugated surface 62 and the water will moisten the feathers to assure good electrical contact. Fresh water is constantly circulated over the corrugated surface 62 to prevent the build-up of undesirable waste material on the corrugated surface.

It is to be understood that while I have illustrated and described certain forms of my invention, it is not to be limited to the specific form or arrangement of parts herein described and shown.

What I claim and desire to secure by Letters Patent is:

1. Apparatus for electrically shocking poultry in a poultry processing operation comprising:
   a. a poultry conveyor having a track with a plurality of poultry supporting shackles spaced therealong and movable in a defined path, said shackles engaging legs of poultry to support same head down;
   b. an electrical conductor positioned in a portion of said path for electrical circuit making contact with said poultry as it moves thereby;
   c. an electrically conductive grid located in said portion of the path and spaced below said shackles a distance for contact with the heads of the poultry suspended from said shackles as they move thereby whereby said poultry heads electrically contact said grid during electrical contact between the poultry and said conductor, said grid having upwardly facing surface portions inclined and having a plurality of through openings permitting drainage of waste material from said upwardly facing surface portions;
   d. means applying an electric potential difference between said conductor and said grid whereby poultry in electrical contact with said conductor and said grid complete an electric circuit therebetween and is shocked by an electric current passing into portions of the poultry between the conductor and the grid; and
   e. means electrically insulating said grid and said conductor from said track.

2. A poultry shocking apparatus as set forth in claim 1 wherein:
   a. said grid has the inclined surface portions inclined transversely to said path and being a unitary structure comprised of a plurality of spaced apart rods with the spaces therebetween being said drainage openings, said rods being secured together and having electrical contact therebetween and extending transverse to said path, said grid being V-shaped diverging upwardly, said V-shape being transverse to said path;
   b. said conductor being in electrical contact with said shackles that form a circuit to the legs of said poultry, said shackles being conductive.

3. A poultry shocking apparatus as set forth in claim 2 including:
   a. a plurality of non-conductive support members suspended from said poultry conveyor on opposite sides of said path and said grid, said support members being in supporting engagement with said grid;
   b. means cooperating with said support members for adjusting the spacing between said shackles and said grid;
   c. non-conductive shield members positioned on opposite sides of said grid and said conductor and extending beyond each end thereof preventing accidental contact therewith; and
   d. means associated with said electric potential difference applying means for adjusting the electric potential difference and wherein said electric current being unidirectional current.

4. Apparatus for electrically shocking poultry in a poultry processing operation comprising:
   a. a poultry conveyor having a plurality of poultry supporting shackles spaced therealong and movable in a predetermined path, said shackles engaging legs of poultry to support same head down;
   b. an elongate electrical conductor rail in a portion of said path and positioned for engagement by a poultry supporting shackle as it moves thereby, said engagement being an electrical circuit making contact;
   c. a plurality of spaced apart elongate electrical conductor members with drain openings therebetween and with said conductor members extending transversely of said path and spaced below the shackles a distance for contact by heads of poultry supported by said shackles as they move thereby, said conductor members being located in said portion of the path having said rail whereby the poultry heads contact said conductor members during engagement of the respective shackle with said rail;
   d. means applying an electrical charge to said rail and said conductor members whereby heads of poultry moving along said path portion engaging said conductor members complete an electrical circuit and the poultry is shocked by an electrical current passing into the body of the poultry between the conductor member and shackle engaging said rail.

5. Poultry shocking apparatus as set forth in claim 4 wherein:
  a. said electrical conductor rail has a lateral face substantially parallel to said path portion;
  b. said shackles have poultry leg engaging portions spaced longitudinally of said path and spaced members extending upwardly therefrom engaging said rail whereby poultry supported thereon is oriented and facing transversely of said path portion;
  c. said conveyor having a track with trolleys suspended therefrom with the shackles suspended from said trolleys and said rail face being positioned to hold the shackles laterally of said path portion and weight of poultry holds the shackles in engagement with said rail face.

6. Poultry shocking apparatus as set forth in claim 5 wherein:
  a. said conductor members are elongate rails having rounded surfaces.

7. Poultry shocking apparatus as set forth in claim 6 including:
  a. rigid side members connecting said plurality of conductor members at ends thereof in a unitary structure with the rods being spaced apart along said side members.

8. Poultry shocking apparatus as set forth in claim 7 and including:
  a. said track being elongate and positioned along said predetermined path;
  b. side shield panels;
  c. support means carried by said track and extending laterally therefrom to opposite sides thereof;
  d. means connecting said shield panels to said support means in laterally spaced relation to define an open passage through which said path extends;
  e. means on said side shields removably supporting the side members of said conducting members;
  f. means cooperating with said support means for adjusting the spacing between said conductor members and said shackles.

9. Poultry shocking apparatus as set forth in claim 8 and including:
  a. a ramp member having an end portion connected to the conductor member structure and inclined downwardly toward the direction from which the poultry move into the passage.

10. Poultry shocking apparatus as set forth in claim 5 including:
  a. means associated with said conductor members and said rail electrically insulating same from said trolleys and said track; and wherein
  b. said conductor members being V-shaped diverging upwardly, said V-shape being transverse to said path;
  c. said electric current being unidirectional current.

11. Apparatus for electrically shocking poultry in a poultry processing operationg comprising:
  a. a poultry conveying means having a track and having portions suspended from said track and movable in a defined path and operable for supporting poultry head down;
  b. an electrical conductor positioned in a portion of said path for electrical circuit contact with said poultry as it moves thereby;
  c. a lower member located in said portion of the path and spaced below said conveying means movable portions a distance for contact with portions adjacent the heads of the poultry suspended from the conveying means movable portions as they move thereby, said lower member having an upwardly facing surface portion inclined;
  d. means making electrical contact with said lower member whereby said poultry portions are in electrical circuit contact with said electrical contact making means during electrical contact between the poultry and said conductor;
  e. means forming a discharge opening from the lower member whereby said discharge opening is operable to permit drainage of waste material from said lower member;
  f. means applying an electric potential difference between said conductor and said electrical contact making means whereby poultry in electrical contact with said conductor and said electrical contact making means complete an electric circuit therebetween and is shocked by an electric current passing into portions of the poultry between the conductor and the lower member; and
  g. insulating means electrically isolating said conductor from said track.

* * * * *